Patented Jan. 20, 1953

2,626,256

UNITED STATES PATENT OFFICE 2,626,256

DERIVATIVES OF STREPTOMYCIN AND METHODS OF MAKING THEM

Walter A. Winsten, Forest Hills, N. Y., assignor to Food Research Laboratories, Inc., Long Island City, N. Y., a corporation of New York No Drawing. Application May 26, 1950,
Serial No. 164,598

8 Claims. (Cl. 260—210)

This invention relates to novel derivatives of streptomycin and methods of making them. These novel derivatives are themselves antibiotics. They can also serve as intermediates in the synthesis of further streptomycin derivatives that are also useful as antibiotics.

In particular this invention relates to nitroalkane derivatives of streptomycin.

As is known, the antibiotic streptomycin has a complex structure, being composed of the base streptidine linked glucosidically to a sugar-like moiety streptobiosamine. Streptobiosamine in turn consists of the moieties streptose and N-methyl-1-glycosamine. The streptose moiety provides streptomycin with its free primary aldehyde group. The chemistry of streptomycin has been described in a book entitled "Streptomycin" edited by S. Waksman, published by Williams and Wilkins Co., Baltimore, 1949.

I have discovered that the free aldehyde group of streptomycin may be reacted with nitroalkanes of the type $R \cdot CH_2NO_2$ where R is aliphatic or H. It is known that nitroalkanes in the form of their aci-salts will react with primary aldehyde groups. I have discovered that application of this reaction to the aldehydic group of streptomycin yields derivatives of the latter which are useful as antibiotics and as intermediates in the syntheses of other antibiotic derivatives of streptomycin.

In bringing about the reaction of streptomycin with nitroalkanes, a solution of a streptomycin salt is allowed to interact with the nitroalkane in methanol solution in the presence of an alkaline agent such as sodium methylate. I can also use aqueous solutions, in which case the alkaline agent is sodium hydroxide.

The alkaline agent causes the nitro-alkanes to form their aci-sodium salts and these react with the aldehyde group of streptomycin. Representing streptomycin as Strep-CHO, the reaction may be written as:

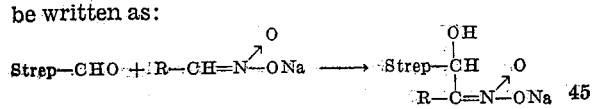

The aci-salt may be converted to the free acid which then rearranges to give the nitro derivative:

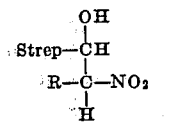

This is accomplished by adding a weak acid such as acetic acid to a solution or suspension of the aci-salts in methanol.

In the above formula it is to be noted that an additional asymmetric center has been created at the carbon atom of the aldehyde group of streptomycin. Thus in the reaction I have possibly obtained a mixture of epimeric forms. No attempt has been made to separate the two epimeric derivatives to determine their relative amounts.

The resultant nitroalkane derivatives of streptomycin have antibiotic potency when tested against *Micrococcus pyogenes*, strain H. Being simple nitro derivatives, they may, if desired, be converted in the well known way by reduction with Raney nickel and hydrogen to primary amines which I have discovered are in turn also possessed of antibiotic activity. The amines have the formula:

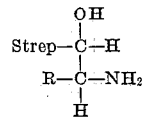

The amines may, if desired, be converted to substituted amines of the type:

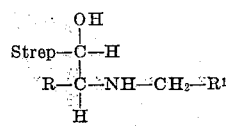

by reacting said amines with aldehydes of the type $R^1$—CHO to form Shiff bases followed by catalytic reduction with hydrogen in a similar fashion as described by me in my pending application, Serial No. 43,349, in which I describe a similar reaction of streptomycylamine and aldehydes followed by catalytic reduction.

Reinspection of the compounds of the type

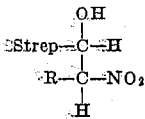

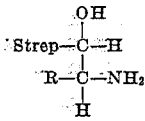

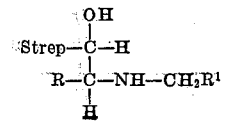

reveals their similarity to the structure of dihydrostreptomycin represented as

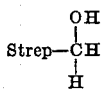

The amine derivatives shown are in a sense derivatives of ethanolamine.

Accordingly, it is among the principal objects of this invention to provide novel derivatives of streptomycin characterized by the molecular structure:

I. 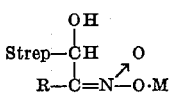

wherein the symbol Strep has the significance described above; the symbol R stands for an aliphatic residue or hydrogen; and M stands for an alkali metal or its equivalent.

Another object is the provision of derivatives of streptomycin characterized by the molecular structure:

II. 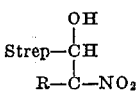

and

III. 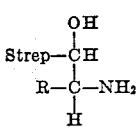

wherein "Strep" and "R" have the same significance as has just been defined.

A still further object is the provision of derivatives of streptomycin characterized by the molecular structure:

IV. 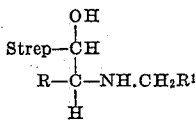

wherein one of the amino hydrogen atoms of structure III, supra is substituted by $R^1$ which may be basically aliphatic, aromatic, or a combination thereof.

Another object is the provision of derivatives of streptomycin characterized by the molecular structure:

V. 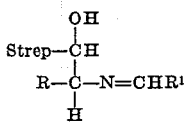

such compounds being aldimine precursors of the components typified by the Structure IV, supra.

Included among the objects of this invention and constituting some of the features thereof are the methods of preparing the several classes of compounds characterized by molecular structures above described.

I shall now describe some examples of this invention, the principles of which may be applied in an extension of these specific teachings to the synthesis of other derivatives.

*Example 1*

200 mgs. of streptomycin hydrochloride-calcium chloride double salt was dissolved in 2 ml. of hot dry methanol. The solution was cooled and 2 ml. more of dry methanol was added; 6 ml. of 0.28 N sodium methylate in dry methanol was added. A white precipitate formed; 0.5 ml. of nitromethane was added and the precipitate dissolved. After a few minutes the clear yellow solution became turbid and within one hour the precipitation of the sodium salts of the epimeric nitro alcohol streptomycin derivatives was practically complete. The precipitated salts were centrifuged, washed once in the centrifuge with dry ethanol, then with ether and dried. The yield was about 80%. On some occasions after alcohol washing, the sodium salts were resuspended in methanol and a little glacial acetic acid was added. The salts dissolved and the aci forms were converted to the usual nitroalkane structure. They could then be precipitated with ether and were obtained contaminated with salts from the neutralization of the aci form. Paper chromatograph analysis of the nitro alcohol products, carried out by the chromatographic technique as described in my aforesaid copending application, revealed that the nitromethane derivatives of streptomycin were antibiotics against *Micrococcus pyogenes*, strain H. Their $R_F$ values were too close for good separation on paper chromatograms using the developing solvent wet n.—butanol—2% piperidine—2% p.—toluene sulfonic acid. Their $R_F$ values were however lower than that of streptomycin itself.

*Example 2*

200 mgs. of streptomycin hydrochloride-calcium chloride double salt were dissolved as described in Example 1. 0.5 ml. of nitroethane was added. The solution was allowed to stand one day at room temperature. The sodium salts of the nitroethane epimeric derivatives of streptomycin did not precipitate from solution as did the nitromethane derivatives in Example 1.

Their presence was determined by paper chromatography as indicated above. Unchanged streptomycin was also present in the reaction product. The $R_F$ values of the epimeric nitro ethane derivatives were lower than that of streptomycin. They possessed antibiotic activity against *Micrococcus pyogenes*. Similar results were obtained in allowing the reaction to proceed 11 days at room temperature. On adding glacial acetic acid to a solution of the sodium salts in methanol, and ether, the nitroethane derivatives of streptomycin would be isolated in crude form admixed with unchanged streptomycin.

*Example 3*

Streptomycin hydrochloride-calcium chloride double salt was treated with 1-nitropropane as described under Example 2 for nitroethane. A mixture of the 1-nitropropane streptomycin sodium salts was obtained along with unchanged streptomycin just as described for the nitroethane derivatives. The sodium salts were converted to their normal forms. They were active against *Micrococcus pyogenes* and $R_F$ value below that of streptomycin.

In addition to the above, nitroalkane derivatives were obtained when 1-nitrohexane or 1-nitroheptane were used as reactants. 2-nitropropane, however, under the above condition of synthesis failed to convert streptomycin to the corresponding nitroalkane derivative as evidenced by paper chromatographic analyses of the reaction products. Only unchanged streptomycin could be demonstrated.

The reaction of streptomycin with the nitroalkanes described above may also be used in carrying out corresponding reactions of streptomycin with aryl substituted nitroalkanes, as for example, nitromethyl benzene ($C_6H_5CH_2NO_2$), nitroethyl benzene, nitrobutylbenzene, and other nitroalkyl aromatics. In such cases there may be obtained the aryl substituted compounds of the type described above, as for example:

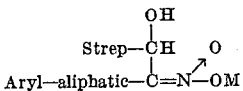

wherein M stands for an alkali metal or its equivalent, and

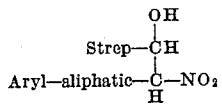

It will be understood that the foregoing description of the invention and the examples set forth are merely illustrative of the principles thereof; and accordingly that the appended claims are to be construed as defining the invention within the full spirit and scope thereof.

I claim:

1. A compound of the group consisting of nitro compounds having the formula

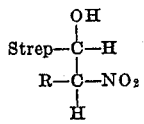

and the alkali metal salts of the aci-form of said nitro compounds wherein R is a member of the group consisting of hydrogen and alkyl.

2. A compound in accordance with claim 1 wherein R is hydrogen.

3. A compound in accordance with claim 1 wherein R is methyl.

4. A compound in accordance with claim 1 wherein R is ethyl.

5. The sodium salt of the aci-form of the compound of claim 2.

6. The sodium salt of the aci-form of the compound of claim 3.

7. Process which comprises dissolving streptomycin in methanol, adding thereto sodium methylate, followed by adding a nitroalkane, allowing the aforesaid components to interact thereby to form the sodium salt of the epimeric nitro alcohol streptomycin having the formula

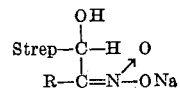

wherein R is a member of the group consisting of hydrogen and alkyl.

8. Process of converting the sodium salts of the aci-form defined in claim 1 into the corresponding nitro compound which comprises suspending said salts in methanol, adding acetic acid thereto, and isolating the nitro compound.

WALTER A. WINSTEN.

REFERENCES CITED

The following references are of record in the file of this patent:

Winsten Abstracts of Papers, 114th Meeting ACS (1948), page 31 c, 1 page.